April 12, 1932.  A. R. LAWRENCE  1,853,736
UNDERGROUND CONDUIT
Filed May 31, 1930   2 Sheets-Sheet 1
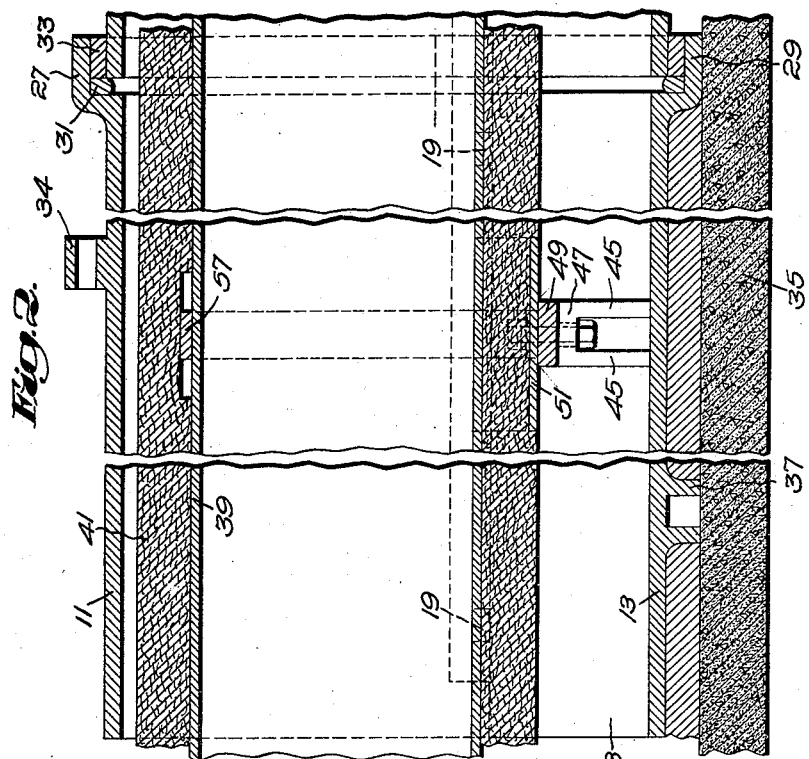
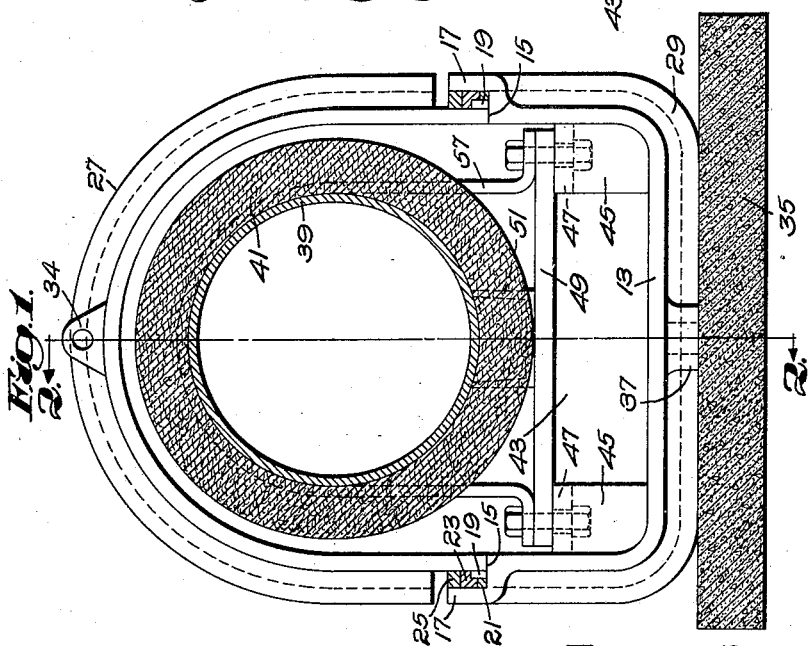

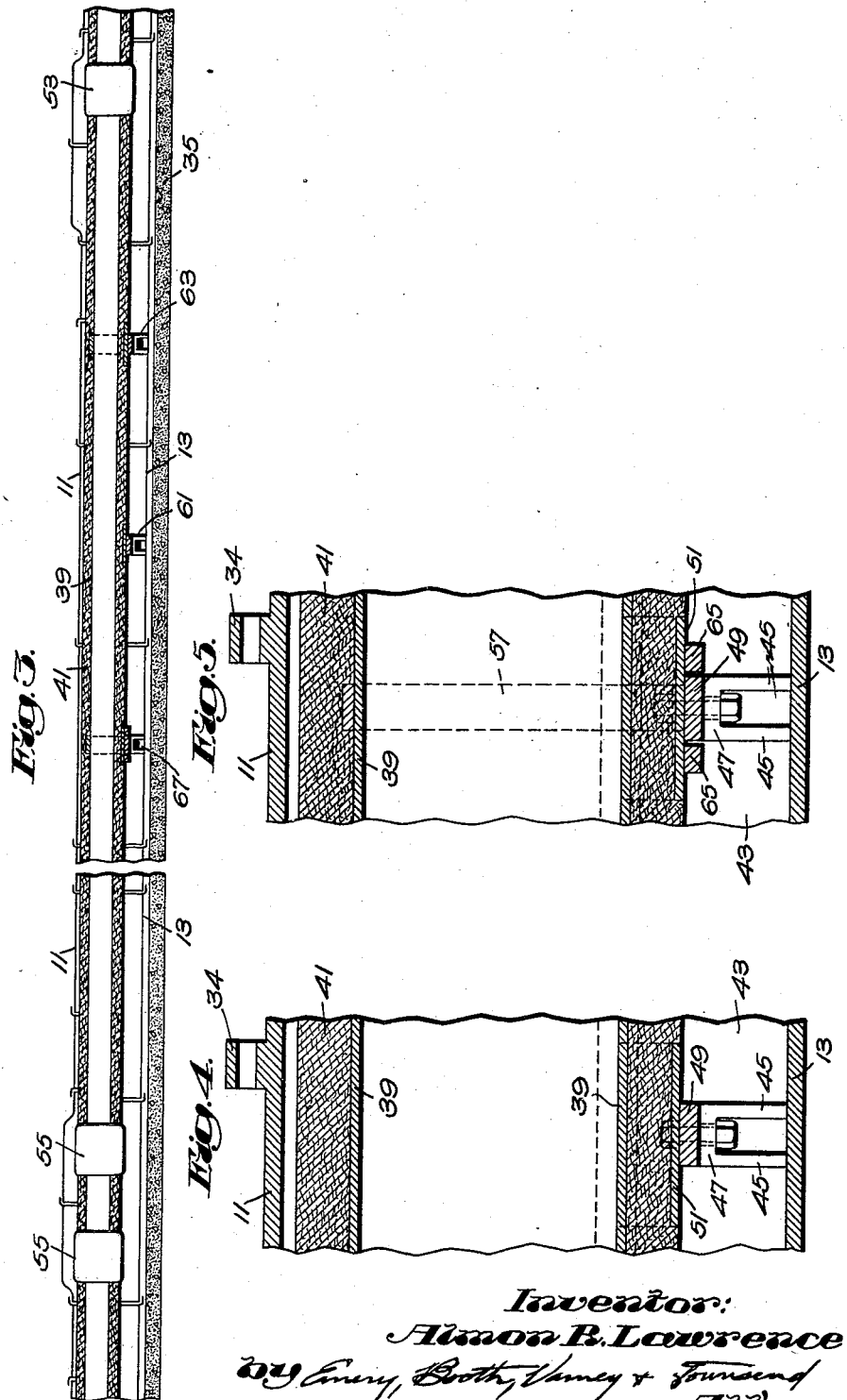

UNITED STATES PATENT OFFICE

ALMON R. LAWRENCE, OF MEDFORD, MASSACHUSETTS, ASSIGNOR TO UNDERGROUND STEAM CONSTRUCTION COMPANY, OF BOSTON, MASSACHUSETTS, A CORPORATION OF MASSACHUSETTS

UNDERGROUND CONDUIT

Application filed May 31, 1930. Serial No. 457,871.

This invention relates to enclosing and protecting conduits for underground pipe lines and more particularly, though not exclusively, for those intended to convey steam for heating or power purposes.

The invention is intended to provide a sectional, waterproof conduit which may be constructed in the form of mechanically simple, standardized units and is adapted to support a pipe line with provision for guiding and anchoring the latter at any desired points while leaving a lower drainage space beneath the pipe line.

The invention will be best understood by reference to the following description when taken in connection with the accompanying illustration of one specific embodiment thereof, while its scope will be more particularly pointed out in the appended claims.

In the drawings:

Fig. 1 is a cross-sectional elevation taken through one of the sectional conduit units embodying one form of the invention and showing the supporting devices utilized to support and guide the pipe line;

Fig. 2 is a central, longitudinal, sectional elevation, partly broken away, showing the unit illustrated in Fig. 1;

Fig. 3 shows a portion of a typical pipe line equipped with protecting conduit units of the type illustrated in Figs. 1 and 2;

Fig. 4 shows a supporting device for the pipe line arranged to function only as a support; and Fig. 5 shows a supporting device arranged to function as an anchor for the pipe line as well as a support.

Referring to the drawings and more particularly to the embodiment thereof as illustrated in Figs. 1 and 2, each conduit unit is preferably constructed of cast iron and comprises an upper section 11 having a generally semi or parti cylindrical contour with opposite, vertical, parallel sides, and a lower or under section 13 having a flattened base and sides which align and mate with the sides of the upper section. The upper edges of the sides for the bottom section are flattened at 15 to provide a seat for the lower edges of the upper section, which latter is placed in mating relation to the lower section. The sides of the lower section are extended laterally and above the seat 15 to present a flanged wall 17 separated from the sides of the upper section by a space adapted to be filled with waterproof compound. Preferably the lower edges of each side of the upper section are provided with one or more laterally extending lugs 19 (herein two in number) which extend into the space referred to and assist in interlocking the two sections together after the packing has been inserted.

As a practical method of waterproofing the joint between the upper and lower sections a body 21 of oakum is first packed in place which is then covered by a layer 23 of a joint compound, preferably some fusible metal, such as leadite, after which the upper part of the space is filled in with a layer 25 of roofing pitch.

At one end of the conduit unit, the upper section is provided with a bell-shaped enlargement 27 and the lower section with a similar enlargement 29. When the upper and lower sections are joined as described, this provides an enlargement for one end of the section into which the adjoining end of the next adjacent section may be inserted in telescopic relation, after which the joint is sealed with a body 31 of oakum and a filling 33 of joint compound, such as leadite. The upper section is provided with an apertured lug 34 by which it may be lifted and lowered into place by any suitable hoisting apparatus.

In laying the conduit each lower section is preferably placed upon a bed or mat 35 of concrete and bears thereon through the enlarged, flattened end 29 of the lower section and one or more additional depending feet or lugs 37. After the conduit has been laid upon the mat or bed 35 and brought to the proper level, the space between the bed and the flattened bottom of the conduit may be filled in with grouting, as indicated in Fig. 2.

This construction provides a continuous, sectional, waterproof conduit firmly supported on a concrete bed.

Within the conduit, the pipe line, which is provided with the usual insulating covering 41, is supported at appropriate intervals above the bottom of the lower section so that an ample drainage space 43 is provided below the level of the pipe line.

It will be understood that in laying the pipe line the lower section of any one conduit unit is first positioned in the trench and the pipe then placed on its supports therein, after which the upper section is secured in place on top of the lower section to completely encase the pipe.

To support the pipe line, the lower conduit section has cast on each opposite side of its inner walls a pair of vertical lugs 45 having a connecting cap piece 47. Bridging the opposite pairs of lugs there is provided a supporting cross plate 49, each opposite end of which is rigidly bolted to the lugs by bolts passing through the plate and the cap piece. The supporting cross plate 49 has an upper flat bearing face and acts as a rest for the cradle 51. The latter comprises a member of generally U-shaped cross section elongated in the direction of the pipe line, so that its flat under supporting face extends for a substantial distance beyond each opposite side of the cross plate, as shown in Figs. 2, 4 and 5. The insulating covering 41 is cut or slit longitudinally to receive the upright sides of the cradle and the pipe rests and is supported thereon. The cradle has the upper edges of its upright sides fixedly secured to the pipe line, as by welding, so that it not only serves as a cradle support but is rigidly secured to the pipe line and adapted to move therewith over and upon the cross plate when and if the pipe line undergoes expansion or contraction. The cradle therefore provides a support for the pipe which is fixed thereto but leaves substantiaclly no uninsulated or exposed portion in the pipe line.

Supporting devices, such as described, may be provided at any desired intervals, but in the illustrative from of the invention a single pair of lugs and a single supporting device is provided for each conduit unit so that the pipe is provided with a single support at each successive conduit unit.

In a pipe line of this description it is desirable to provide at certain points expansion joints of some suitable construction so that the expansion and contraction of the pipe line will be automatically taken care of. In the typical pipe line represented in Fig. 3 I have conventionally represented one such expansion joint at 53 and other expansion joints at 55. In order that these expansion joints may properly function, it is also desirable that the pipe line be anchored or held against movement at some point intermediate the successive expansion joints, so that the expansion of a section of the pipe line adjoining any given expansion joint will take place in a definite direction with relation to the anchored part of the pipe line.

It is also desirable that the pipe line, besides being supported, should be so guided that its expansion will take place in an axial direction and any tendency of the pipe to buckle sidewise or upwards or to lift away from its support will be prevented.

The described construction of the supporting devices provides means for carrying out both the anchoring and guiding functions at such points as are required.

The supporting device shown in Fig. 4 comprises the parts heretofore referred to and functions merely as a support without either a guiding or anchoring function. In this construction the cradle 51 to which the pipe is fixedly secured rests upon the cross plate 49 and is adapted to move thereover with the pipe as the latter expands or contracts.

In Figs. 1 and 2 the support is additionally arranged to serve also as a guide to prevent the buckling of the pipe. This is accomplished by providing a strap or yoke 57 which passes loosely over the pipe 39 and has its ends fixedly connected to the pipe support as by being bolted to the cross plate 49 and the cap piece 47 for the lugs. This strap or yoke, while permitting the pipe to move longitudinally within the same under expansion or contraction, holds the pipe both vertically and laterally against any buckling tendency and acts to guide the same so that expansion and contraction of the pipe takes place in a substantially axial direction. In the typical pipe line shown in Fig. 3, I have shown at 61 one of the supports serving only as a support and at 63 one of the supports serving both as a support and additionally as a guide. In practice the supports and guides are arranged at suitable intervals and may, for example, be arranged in alternation.

At some point intermediate successive expansion joints a support is provided with means which serve also to anchor the pipe line. This construction is shown in Fig. 5. The anchoring function is secured by merely providing the under face of the cradle 51 with depending lugs 65 which project down on opposite sides of the cross plate and are so positioned as to prevent any substantial movement of the cradle with reference to the cross plate, thereby anchoring the pipe line at that point. The support is also provided with the strap or yoke 57 so that it cannot free itself from the supporting cross plate by lifting or buckling. A supporting device equipped to function as an anchor is represented at 67 in Fig. 3 at a point intermediate successive expansion joints 53 and 55.

While I have herein shown and described for purposes of illustration one specific embodiment of the invention, it is to be understood that extensive deviations may be made from the details of construction herein

Claims:

1. An enclosing conduit for an underground pipe line consisting of mating units, each comprising an upper section having a particylindrical contour and an under section having a flattened base connected to the upper section by a water excluding joint, supporting devices for the pipe line for supporting the latter above the bottom of the lower section to provide a drainage space thereat, the supporting devices for each section comprising supporting lugs formed internally on opposite sides of the under section and arranged at predetermined points in said conduit, a supporting cross plate secured to opposite lugs, a cradle having a U-shaped cross section fixedly secured to the under side of the pipe and having its under side resting on said plate, the supporting devices of certain of said sections having a strap or yoke loosely passing over said pipe and having its ends secured to the cross plate to provide guiding supports for maintaining the pipe in alignment, and the said guiding supports of certain of said sections having anchoring means to prevent any substantial longitudinal movement of said pipe with relation to the supporting devices, said anchoring means comprising depending lugs on certain of said cradles embracing the sides of the cross plate.

2. An enclosing conduit for an underground pipe line having sectional units provided with supporting devices for the pipe line for supporting the latter above the bottom of the conduit to provide a drainage space thereat, the supporting devices comprising a cross plate fixedly secured to opposite sides of the conduit, a member fixedly secured to the bottom of the pipe line and having its lower face mounted for sliding movement on the cross plate, and means for guiding the pipe line to maintain it in alignment and prevent buckling, said means comprising a guiding yoke member encircling the pipe and fixedly secured to the cross plate.

3. An enclosing conduit for an underground pipe line having sectional units provided with a supporting device for the pipe line for supporting the latter above the bottom of the conduit, said supporting device comprising a cross plate fixedly secured to opposite sides of the conduit, a cradle secured to the bottom of the pipe line having its lower face resting upon the cross plate, a yoke member embracing the pipe line and fixedly secured to the cross plate, and means for preventing longitudinal movement between the cradle and the cross plate.

4. An enclosing conduit for an underground pipe line having sectional units provided with supporting devices for the pipe line for supporting the latter above the bottom of the conduit, comprising each a transverse supporting member fixedly secured to opposite sides of the conduit, and a cradle member secured to the bottom of the pipe and resting upon said transverse member, and expansion joints for said pipe line, one of said supporting members between successive expansion joints having means to prevent any substantial longitudinal movement between the cradle and the transverse supporting member.

5. An enclosing conduit for an underground pipe line composed of sectional units, expansion joints for the pipe line, and a plurality of supporting devices between successive expansion joints adapted to support the pipe line above the bottom of the conduit to provide a drainage space thereat, said supporting devices comprising cross supporting members fixedly secured to opposite sides of the conduit, cradles secured to the bottom of the pipe resting upon said cross members, certain of said supporting devices being provided with a guiding yoke fixedly secured to the cross member for maintaining the pipe in alignment, and one of said supporting devices between successive expansion joints having means for anchoring the pipe line and preventing its movement with relation to the supporting member.

6. The combination with a pipe line, of an enclosing conduit therefor, supporting devices for the pipe line comprising lugs formed internally at opposite sides of the conduit, an insulating covering for the pipe line, a supporting cross plate secured to the lugs, a cradle having connecting members embedded in the insulating covering and fixedly secured to the under side of the pipe, said cradle having an under side resting on said plate and in sliding engagement therewith, and a guiding yoke loosely embracing said pipe and having its ends secured to the cross plate.

7. The combination with a pipe line, of an enclosing conduit therefor, supporting devices for the pipe line comprising lugs formed internally at opposite sides of the conduit, an insulating covering for the pipe line, a supporting cross plate secured to the lugs, a cradle having connecting members embedded in the insulating covering and fixedly secured to the under side of the pipe, said cradle having an under side resting on said plate and in sliding engagement therewith, a guiding yoke loosely embracing said pipe and having its ends secured to the cross plate, and means for preventing movement of the cradle longitudinally with reference to the cross plate.

8. The combination with a pipe line, of an enclosing conduit therefor, expansion joints in the pipe line, a support for the pipe line comprising a supporting rest presented to the conduit, a member secured to the pipe line and supported by said rest, a yoke member for the pipe line secured to the supporting rest, and means for preventing any substantial longitudinal movement of the pipe line with relation to the rest.

In testimony whereof, I have signed my name to this specification.

ALMON R. LAWRENCE.